United States Patent Office 3,355,039
Patented Nov. 28, 1967

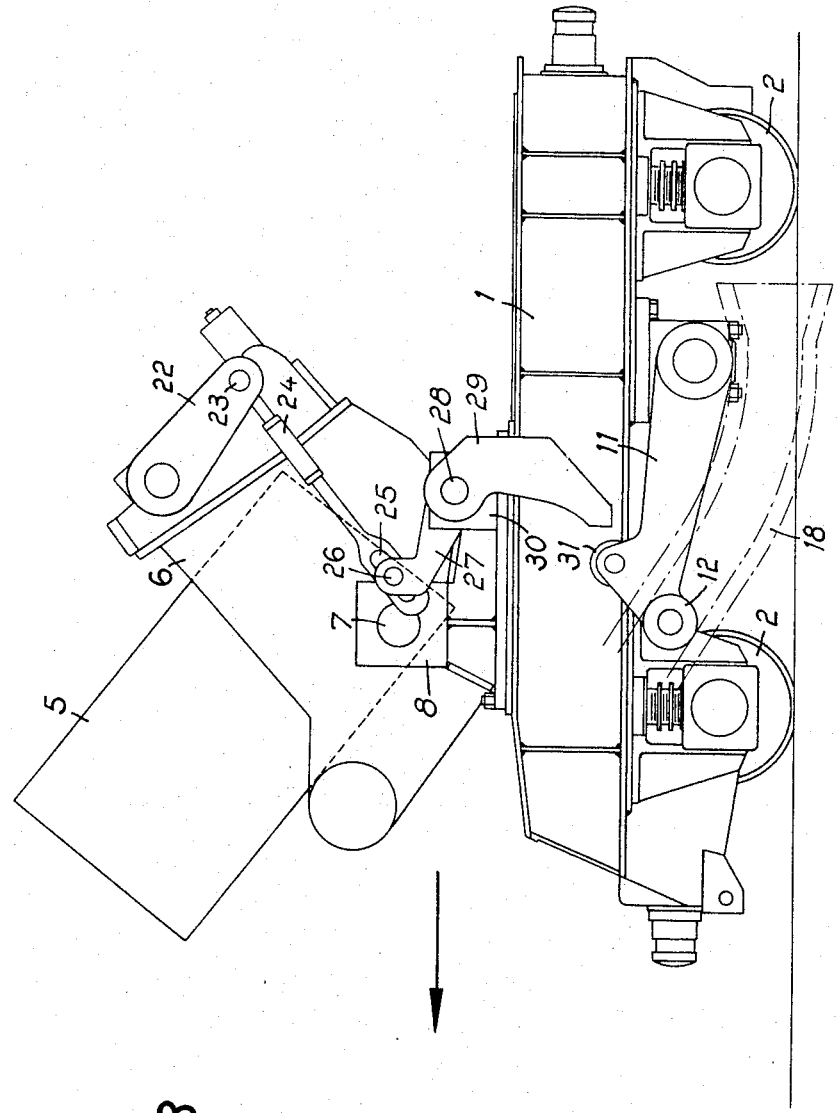

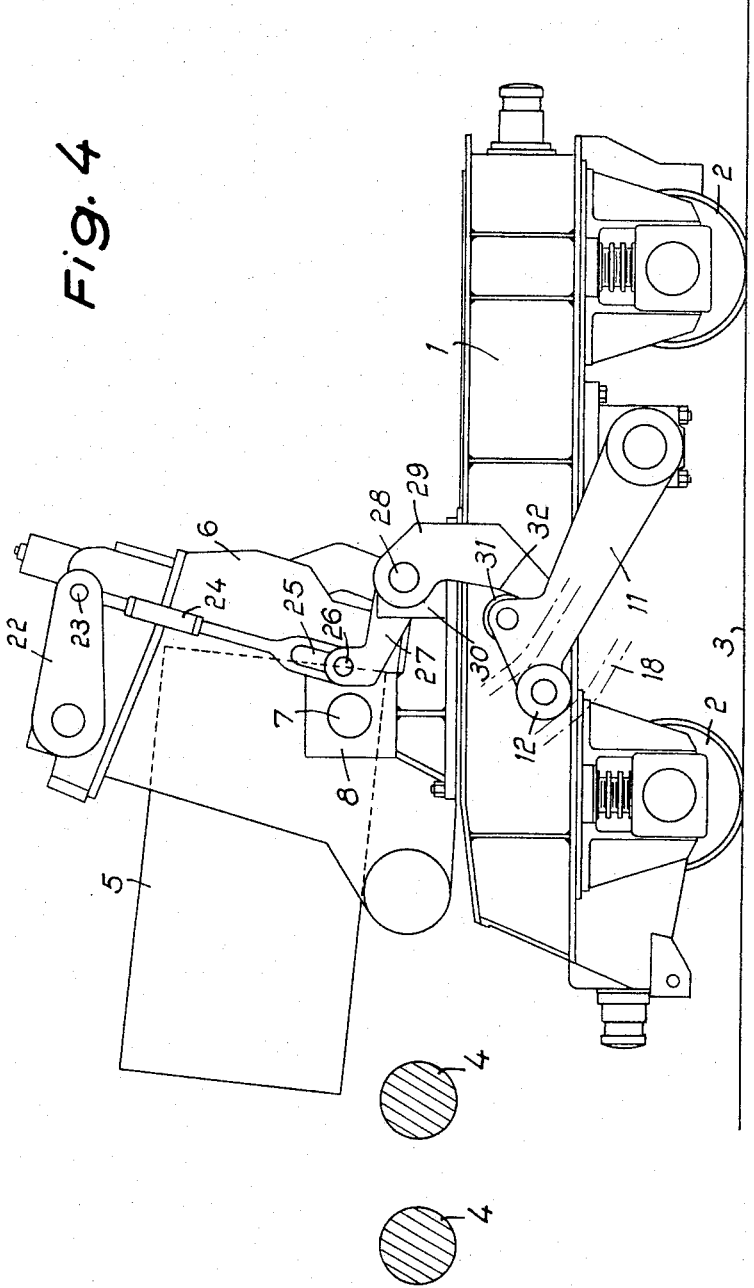

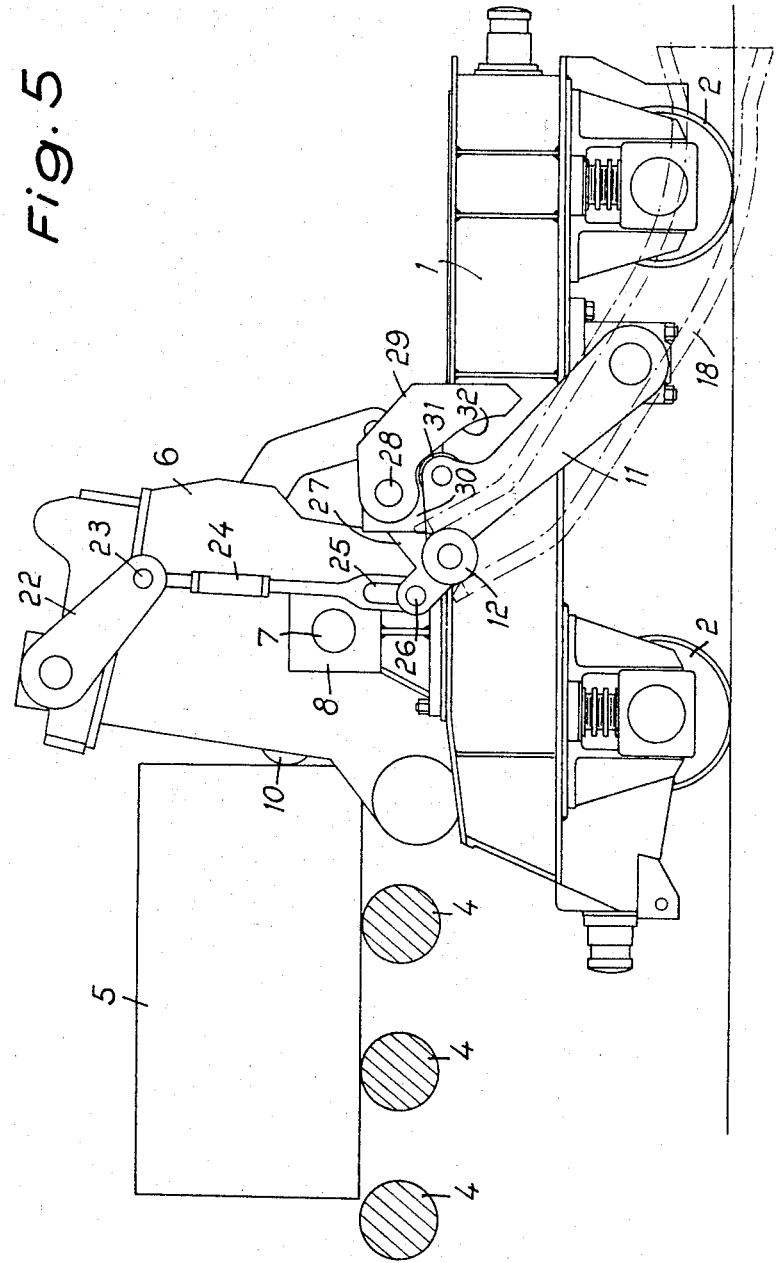

3,355,039
INSTALLATION FOR FEEDING INGOTS
TO A ROLLER TABLE
André Nectoux, Le Creusot, France, assignor to Societe
des Forges et Ateliers du Creusot, Paris, France
Filed Apr. 14, 1966, Ser. No. 542,606
Claims priority, application France, Apr. 22, 1965, 14,157
2 Claims. (Cl. 214—62)

ABSTRACT OF THE DISCLOSURE

A feeding device for ingots to a roller table includes a carriage movable along an axis of the table. The carriage has a chassis and a tiltable cradle including a pusher mounted on the chassis. The cradle is tilted on the chassis about an axis at right angles to the direction of movement of the carriage. A stationary ramp is provided for tilting the cradle and for actuating the pusher during movement of the carriage toward the table, the cradle first being tilted and the pusher then being actuated to push the ingot onto the table.

---

The invention relates to an installation for feeding ingots to a roller table.

Reference is made to applicant's United States Patent No. 3,312,360 titled Installation for Feeding Ingots to a Roller Table.

This invention applies more particularly to the case in which the track on which the trolley carrying the ingots moves is on the axis of the receiving roller table.

In the above-mentioned patent the trolley which transports the ingot moves at right angles to the axis of the receiving table.

The installation forming the subject of this patent application has certain characteristics which are similar to those already described in the above-mentioned patent application and in the application for a patent of addition and additional characteristics concerning the new relative layout of the track bearing the trolley and the receiving table.

The invention relates to an installation comprising a trolley movable along the axis of the table, the trolley comprising a chassis and a cradle tiltable to transfer an ingot to the table. This installation is characterised in that the cradle is tiltable on the chassis about an axis at right angles to that of the table; and that the installation comprises elements to control the tilting action and at least one ramp, which is stationary with respect to the installation and serves to actuate these control elements during movement of the trolley towards the table.

The invention will now be described in greater detail, reference being made to an embodiment given as an example and illustrated in the drawings.

FIGURES 3, 4 and 5 represent the trolley as it approaches the roller table, and show the control action for the tilting movement and the movement for pushing the ingot on to the table.

Figure 1:
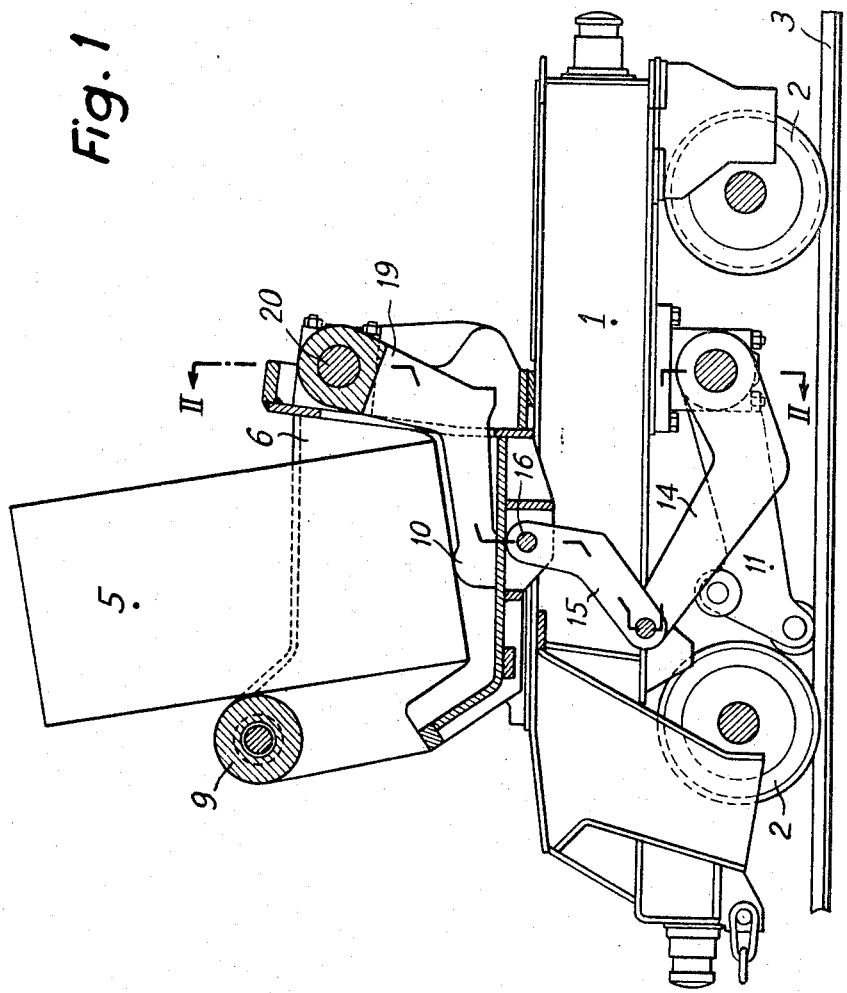
FIGURE 1 is a cross-section through a vertical plane passing through the axis of a trolley which could be used in an installation according to the invention.
Figure 2:
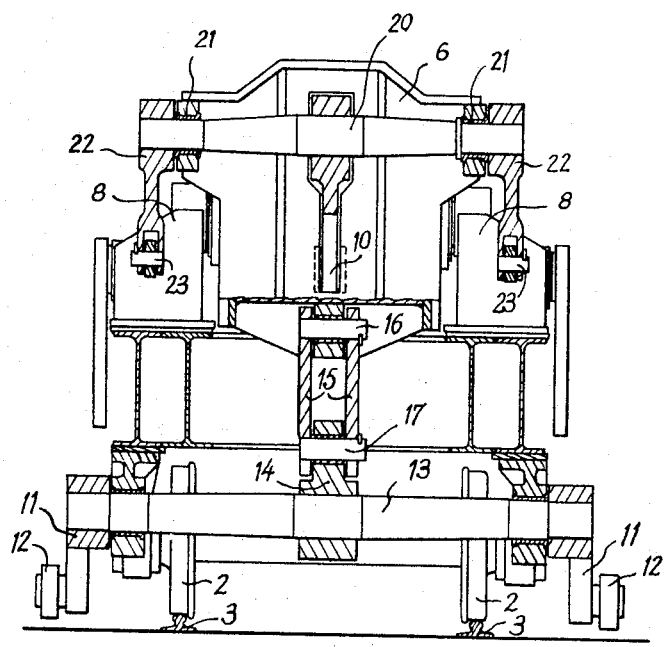
FIGURE 2 is a section along the plane II—II, FIGURE 1.

The trolley represented in the drawings has a chassis 1 mounted on wheels 2, which run on track 3.

It is evident from FIGURES 3 to 5 that track 3 is situated along the axis of the roller table 4 intended to receive the ingot 5. The chassis 1 supports a rocking cradle 6, the pivots 7 of which are carried in the bearings 8 integral with the chassis 1. The ingot 5 rests in the cradle as shown in FIGURE 1 and is supported by the roller 9, over which it can move under the action of the pusher 10 once the cradle has been tilted.

The rocking action of the cradle is controlled by two levers 11 each carrying a roller 12. The shaft 13 for the two levers 11 carries another lever 14 hinged at the connecting rod 15, which in turn pivots about the axis 16 at the base of the cradle 6. Both the lever 14 and the connecting rod 15 pivot about the shaft 17.

A ramp 18 can be provided on one or on both sides of the track 3; the roller 12, which controls the rocking of the lever 11 and thus also the rocking action of the cradle 6, following the inclined surface of this ramp.

As shown in FIGURES 3 to 5, this tilting motion is gradual, the drawings representing three successive positions of the trolley as it approaches the roller table 4.

The trolley also contains a pusher 10 forming the end of the bell-crank lever 19 on the shaft 20, which is carried in the bearings 21 located in the walls of the cradle 6.

Each end of the shaft 20 carries a lever 22 to which the connecting rod 24—possibly of adjustable length—is attached by means of the pivot pin 23.

The connecting rod 24 ends in a slot 25, through which passes the pin 26 fixed in the lever 27; this lever is connected to the shaft 28, which is fixed on the lever 29.

The levers 27 and 29 therefore turn at the same time, their pivot 28 pivoting in the bearing 30 supported by the chassis 1.

The movement of the pusher 10 takes place as shown in FIGURES 3 to 5.

FIGURE 3 shows the start of the rocking action of the cradle 6, the pusher 10 not yet having contacted the ingot 5.

As the cradle 6 tilts, the connecting rods 24 slide in relation to the pin 26 until the pins 26 eventually reach the ends of the slots 25 as a result of relative movement between the pins 26 and the slots 25. From this moment on the connecting rods 24 are pulled by the pins 26 as the cradle continues its tilting motion, so that the pusher 10 begins to take effect underneath the ingot 5.

The lever 11 located on each side of the chassis 1 also carries a roller 31, which comes into contact with the ramp 32 formed by the lever 29. During the rocking movement of the levers 11, the rollers 31 first hold the levers 29 and thus also the pins 26 attached to the levers 27; towards the end of their travel, however, these rollers rock the levers 29 and cause the pins 26 of the levers 27 to move downwards (FIGURE 5). The connecting rods 24 are thus pulled in such a way as to rock the levers 22, and gradually actuate the pusher 10; this pusher completely removes the ingot 5 from the cradle 6 and deposits it on the roller table 4.

The above-described installation therefore brings about the gradual tilting of the cradle carried on the trolley, to transfer the ingot on to a table running along the track on which the trolley runs. With the aid of a simple arrangement, it also enables the ingot to be progressively removed from the cradle.

The invention is, of course, not limited by the details of embodiment described, which can be modified without departing from the scope of the invention.

For instance, rollers and control levers have been provided on both sides of the trolley or the cradle, but for some installations of course controls provided on one side only would be enough.

What I claim is:

1. A carriage, a table, said carriage being movable along an axis of said table, said carriage comprising a chassis, a cradle for an ingot tiltably mounted on said chassis tiltable about an axis at right angles to the direction of movement of the carriage to transfer the ingot to the table, a control lever articulated on said chassis, means for tilting said cradle connected to said control lever, a stationary ramp engaged by said control lever during movement of the trolley along the table rotating said control lever and tilting said cradle, a pusher pivoted in said cradle and means for connecting said pusher and said control lever to push the ingot from the tilted cradle including a lever controlling said pusher pivotally mounted on said carriage and a system of articulated levers connecting said lever to said pusher, said lever being rotated by said control lever at the end of the tipping movement of said cradle toward said table.

2. A carriage as described in claim 1, said means for tilting said cradle including a first link articulated on said cradle and a first arm articulated to said first link, a shaft, said first arm and said control lever being connected to said shaft, said means for connecting said pusher and said control lever including a first lever for moving said pusher rotatably mounted on said cradle, a second arm pivotally mounted on said chassis, a second link pivotally connecting said second arm and said first lever and a second lever for rotating said second arm and a cam surface on said second lever engaged by said control lever after said control lever has tilted said cradle.

References Cited
UNITED STATES PATENTS

| | | | |
|---|---|---|---|
| 694,332 | 2/1902 | Sundt | 214—62 |
| 2,467,970 | 4/1949 | Faris | 214—62 |
| 2,679,325 | 5/1954 | Smith | 214—510 |
| 3,219,211 | 11/1965 | Malcom | 214—84 |

ROBERT G. SHERIDAN, *Primary Examiner.*

GERALD M. FORLENZA, *Examiner.*